J. A. Crandall,
Hobby Horse,
No. 1,287, Reissued Mar. 11, 1862.
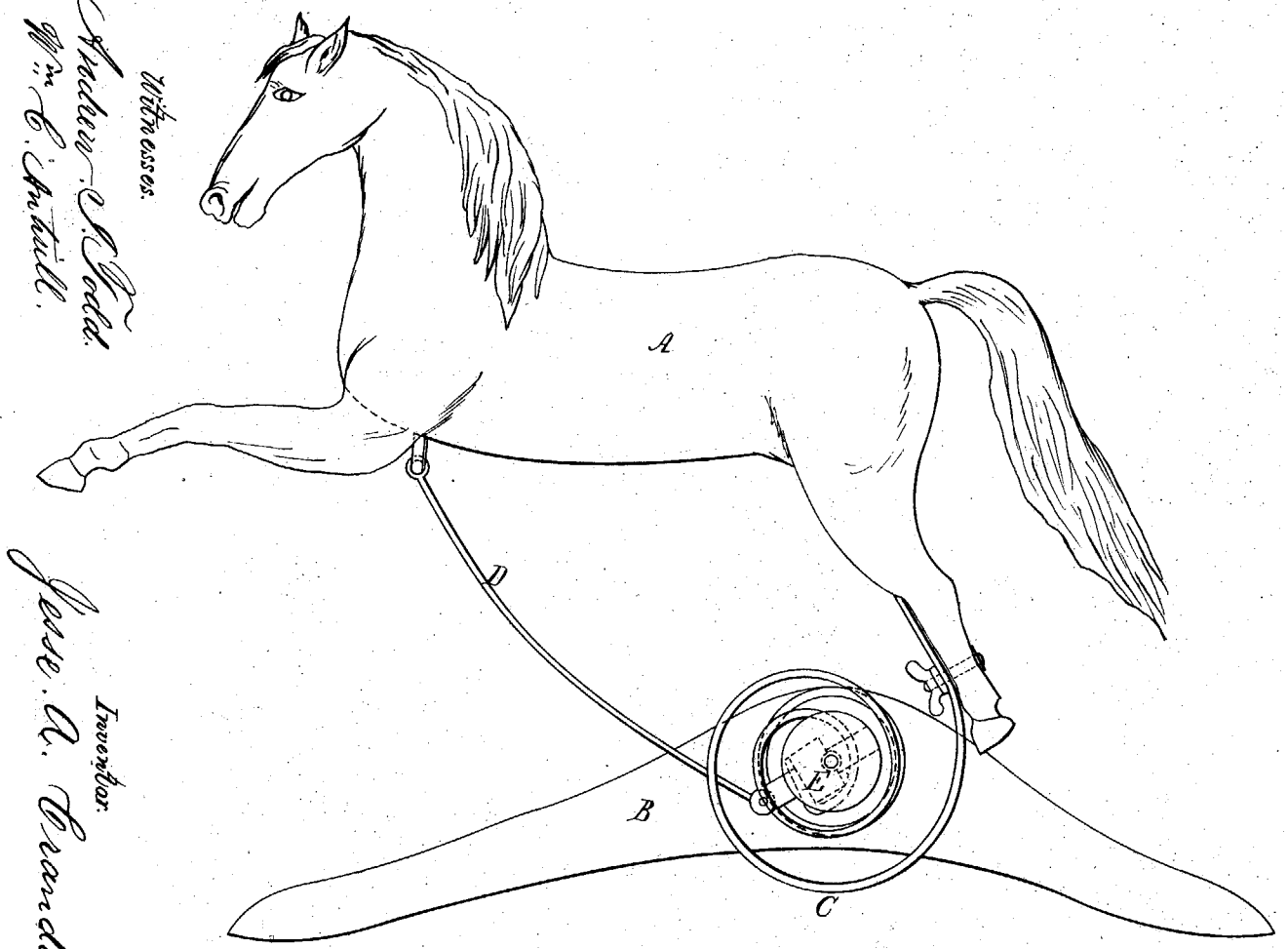
Witnesses.
Andrew J. Todd.
Wm. C. Antill.
Inventor.
Jesse A. Crandall.
AM. PHOTO-LITHO. CO. N.Y. (OSBORNE'S PROCESS)

UNITED STATES PATENT OFFICE.

JESSE A. CRANDALL, OF NEW YORK, N. Y.

IMPROVED ROCKING TOY.

Specification forming part of Letters Patent No. 24,008, dated May 17, 1859; Reissue No. 1,287, dated March 11, 1862.

*To all whom it may concern:*

Be it known that I, JESSE A. CRANDALL, of the State, county, and city of New York, have invented certain new and useful Improvements in Toys; and I do hereby declare that the following is a full, clear, and exact description of the same, reference being had to the drawing which accompanies and forms a part of this specification, and which represent, a side elevation of my improvements.

To enable others skilled in the art to which my said improvements appertain to make and use the same, I will describe their construction and mode of operation.

My invention relates to that class of toys, such as hobby-horses, children's vehicles, &c, which are intended to be made to rock by an impulse imparted to them by the person in or upon them.

In toys of this character the rocking motion prior to my invention has invariably, so far as my knowledge extends, been produced by rockers made and operated like those of an ordinary child's cradle. This method of construction is defective because, among other things, the motion of which such rockers admit is not so gentle and agreeable as it is desirable to produce, and the exertion required to cause toys thus constructed to rock is considerable. At the same time, the action of the rockers upon the floor or carpet is always more or less injurious.

The object of my invention is to produce a rocking motion in toys of the class mentioned in such a manner as to remedy the defects heretofore existing in them, and by means differing substantially from the mode of construction above specified.

In the drawing herein referred to, A represents what I call the "body" of the toy, and B B what I term the "base" or "frame." This base, unlike the ordinary rockers, is not designed to move when the body of the toy is rocked. Across this base is extended a bar or shaft, E, and to said bar I fasten one end of one or more springs, shown at C in the drawing,) for effecting the rocking motion. The other end of these springs is secured, directly or indirectly, to the body A, at or toward its forward part. The form of spring represented is what is called "flat-wound," or "scroll," and is what I deem the best, though other forms may be employed. It will be found best to place the bar E near to the rear end of the base.

As will be seen, the body of the toy, when at rest, is in a rampant or prancing position, and the operation of my invention will be obvious. The least impulse imparted to the body A will cause the spring C to vibrate back and forth and produce a rocking motion, and it is manifest that the movement when effected by these means will at all times be far more equable, easy, and pleasant than when the ordinary rockers are employed, while since as before stated, the base of the toy does not move, no wear of floor or carpet can take place.

In order to prevent the body A from rocking either too far forward or too far back, I generally use another spring, (shown at D,) which I call a "belly-spring," and which is fastened at one end to the shaft E, or to a lug or ear thereon, and at the other end is secured to the forward part of the body, as will be understood by reference to the drawing. This last-mentioned spring is not intended to aid in any respect in producing the rocking movement, and may be omitted, if desired, as I have found that if the spring which effects the rocking is of the proper form, and is made quite strong, it will usually of itself sufficiently regulate the forward and backward motion of the body; but this requires it to be heavier than is generally desirable, and, moreover, the spring D impa ts to the toy an ornamental appearance.

A means of adjusting the body A to higher or lower position, in order to accommodate persons of different weights, or for any other reason, may readily be added to my improvements; but I do not desire to claim here any device for this purpose.

I am well aware that it is common to suspend carriage-bodies upon springs, and there are many toys which employ in their construction springs for a similar or analogous purpose; but in all these, the springs are used solely to lessen shocks and prevent the rocking and pounding to which the thing suspended would otherwise be exposed, or to keep it as nearly as possible at all times in a level position, and the springs are so attached that the kind of movement which my invention is adapted to secure cannot be produced by them. The sole use of the springs which I employ is to cause a rocking or vibrating motion, which is the very thing necessary to be avoided in carriages and the other devices referred to, and these springs are arranged in such a way that they cannot perform any other office.

It will readily be seen that there are many ways in which the formal parts of my improvements may be modified without departing from my invention. Thus, instead of employing a belly-spring, as shown in the drawing, any other elastic or inelastic connection may be made between the shaft E and the body A for the purpose of preventing the latter from rocking too far back or forward; or, in place of attaching the springs which produce the rocking motion as they are attached in the drawing, a strip or platform may be secured to and extended from the forward part of the body toward the rear portion of the toy, and these springs may be fastened to it instead of to the shaft E.

I do not claim the scroll or coil or flat-wound springs, or springs of any form, or any other separate element of the devices herein described; nor do I claim, broadly, imparting a rocking motion to hobby-horses or toys.

Having thus fully described my invention, I wish it to be understood that its leading peculiarity is the radial vibration of the horse or toy around a single center or point of attachment, like the motion of a door on its hinge or the oscillation of a pendulum around its point of suspension. This motion is clearly distinguishable from that of a toy on rockers, where the center of motion is continually changing, as the point of support is transferred along the arc of the rockers, and also from the vibrating motion of a scale-beam, or see-saw, where one portion, or end of the system rises while the other falls. I lay no claim to a toy operating in either of these ways, nor do I claim a platform or base *per se*, or the arrangement of cradles or toys on rockers on fixed or portable platforms or bases; but

What I do claim, and desire to secure by Letters Patent, is—

The combination of the body A, whether made in the form of a hobby-horse or of a toy of other description of the class herein described, with the base B B and a spring or springs, C, for producing a rocking movement, as and for the purpose described.

JESSE A. CRANDALL.

Witnesses:
ANDREW I. TODD,
WM. C. ANTISELL